ROBERT E. KAPTUR
INVENTOR.

BY John R. Faulkner
Donald J. Harrington
ATTORNEYS

ROBERT E. KAPTUR
INVENTOR.

BY John R. Faulkner
Donald J. Harrington
ATTORNEYS

April 29, 1969  R. E. KAPTUR  3,440,903
RATIO CONTROLS FOR A HYDROKINETIC POWER TRANSMISSION MECHANISM
Filed Dec. 12, 1967  Sheet 3 of 3

ROBERT E. KAPTUR
INVENTOR.

BY John H. Faulkner
Donald J. Harrington
ATTORNEYS

United States Patent Office 3,440,903
Patented Apr. 29, 1969

3,440,903
RATIO CONTROLS FOR A HYDROKINETIC POWER TRANSMISSION MECHANISM
Robert E. Kaptur, Birmingham, Mich., assignor to Ford Motor Company, Dearborn, Mich., a corporation of Delaware
Filed Dec. 12, 1967, Ser. No. 690,021
Int. Cl. F16h 47/08
U.S. Cl. 74—732                                         5 Claims

ABSTRACT OF THE DISCLOSURE

This specification describes a hydrokinetic power transmission mechanism having synchronized, multiple-ratio gearing and a hydrokinetic torque converter situated between an internal combustion engine and the power input element of the gearing. The torque converter includes a turbine that is connected to the gearing through tandem overrunning couplings. One coupling provides a torque delivery path during forward drive and the other accommodates coasting torque delivery. The latter coupling can be released selectively to interrupt the driveline during ratio changes.

Brief summary of the invention

This invention relates generally to a semi-automatic power transmission mechanism for use in an automotive vehicle driveline having an internal combustion engine and multiple ratio gear elements. A hydrokinetic torque converter is situated between the engine of the driveline and the power output element of the gearing. The engine is connected directly to the impeller of the torque converter. A conventional neutral clutch, which usually performs this function, is not required.

The turbine of the converter is connected through an overrunning coupling to a torque delivery shaft that extends to the power input shaft of the gearing. A second overrunning coupling, which is capable of being rendered inactive, also connects the turbine and the power input shaft of the gearing although it is adapted to accommodate torque delivery from the shaft to the turbine. The second overrunning coupling is in the form of a multiple coil spring clutch situated between an inner clutch race carried by the shaft and an outer clutch race connected to the turbine. A driver-controlled linkage mechanism is used for actuating and deactivating the coils of the spring clutch, thereby controlling the operation of the second coupling. Provision is made for inhibiting the operation of the second coupling when the relative speeds of rotation of the shaft and the turbine are in excess of the desired value. The second coupling is rendered inactive whenever a ratio change is initiated in the gearing so that the gear elements involved in the ratio change can be controlled under zero torque conditions.

Particular description of the invention

Figure 1:
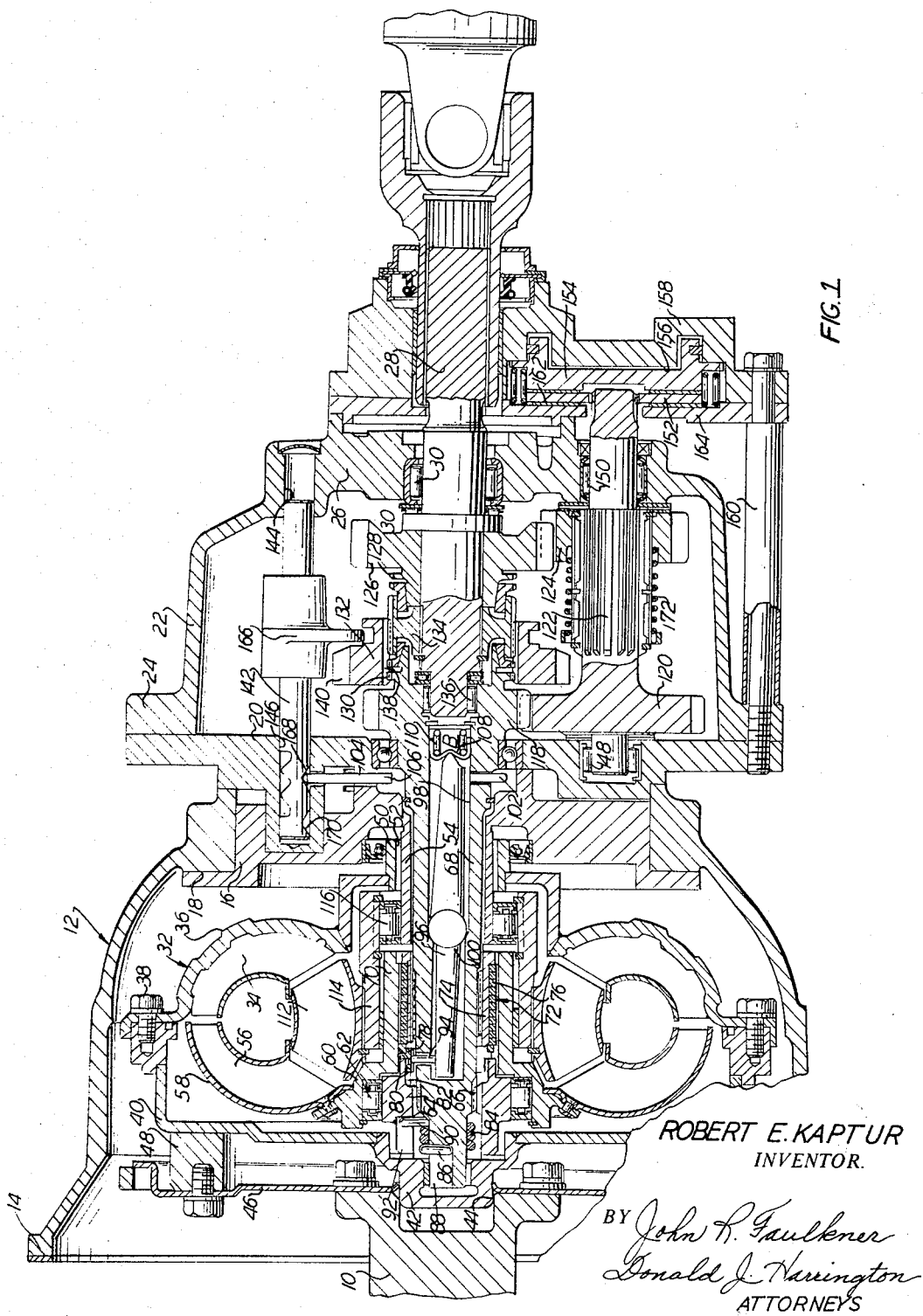
FIGURE 1 shows in longitudinal cross-sectional form an assembly view of my improved transmission mechanism.
Figure 1A:
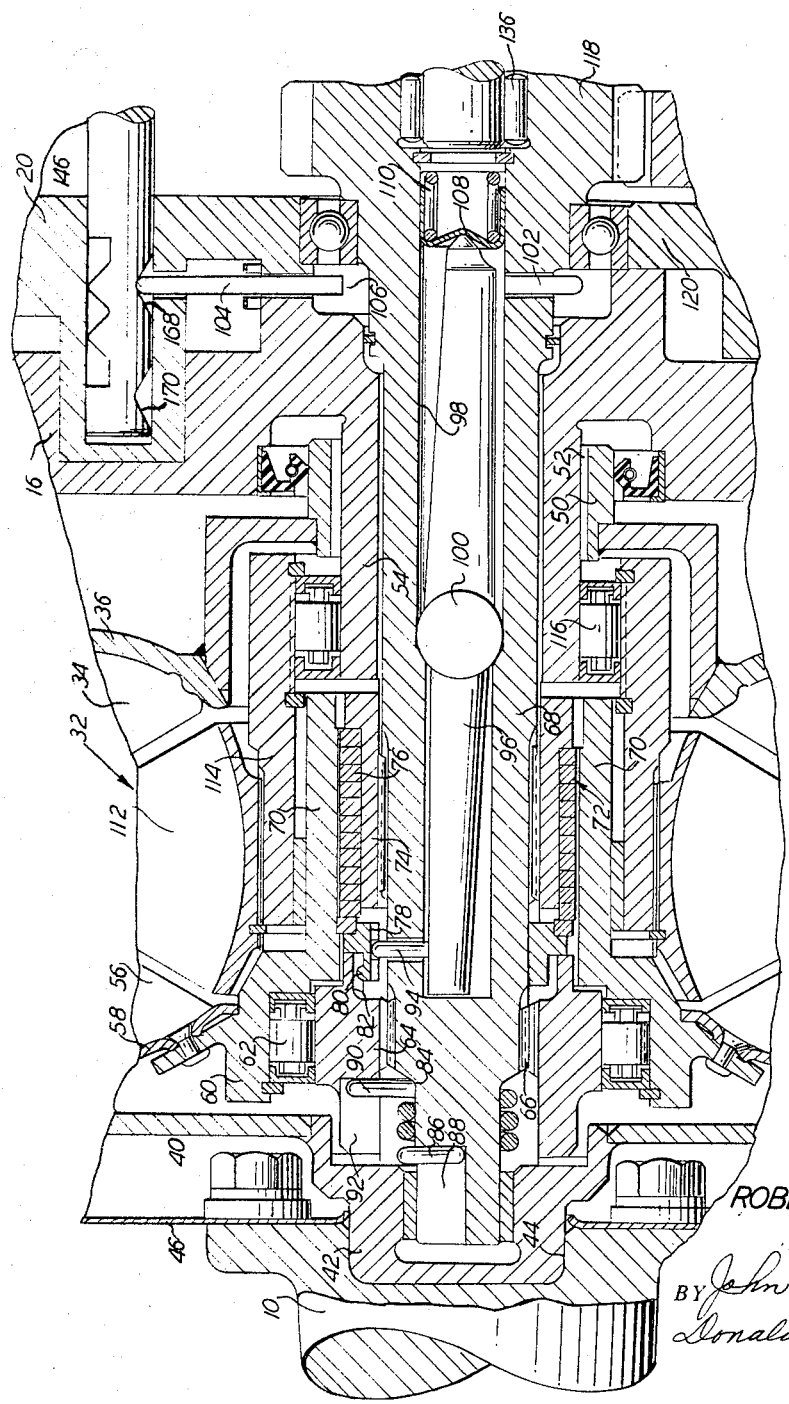
FIGURE 1A shows an enlarged cross-sectional view of a part of the structure of FIGURE 1.
Figure 2:
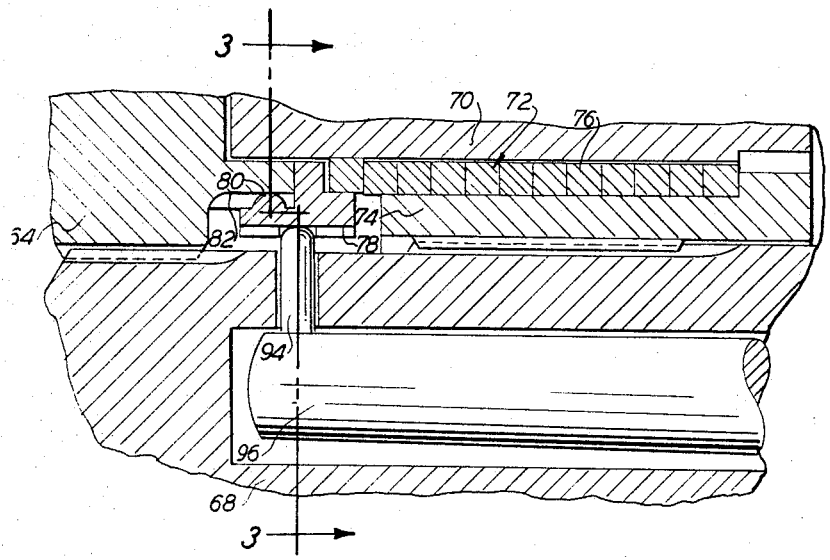
FIGURE 2 is an enlarged view of a portion of the structure in FIGURE 1A.
Figure 3:
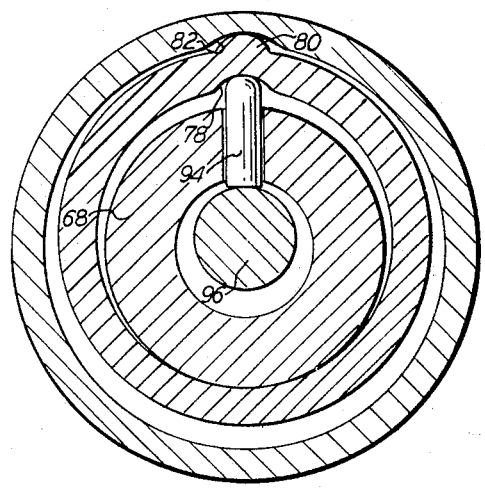
FIGURE 3 is a cross-sectional view taken along the plane of section line 3—3 of FIGURE 2.

In FIGURE 1, numeral 10 designates the end of the crankshaft of an internal combustion engine. Numeral 12 indicates generally a transmission housing having a periphery 14 that can be bolted to the engine block of the internal combustion engine. Secured to the right-hand of the housing 12 is a transverse housing support wall 16, the periphery of which registers with a shoulder 18 formed internally in the housing 12. A housing end plate 20 is secured to the wall 16.

Housing 22, which is bolted at its periphery 24 to the plate 20, encloses torque transmitting gearing. It includes an end wall 26 in which is journalled power output shaft 28, bearings 30 being provided for this purpose.

Housing 12 encloses a hydrokinetic torque converter 32 which includes an impeller 34 having a shell 36, the periphery of the shell being bolted at 38 to the periphery of shell part 40. The hub 42 of the shell part 40 is piloted within pilot opening 44 formed in the crankshaft 10. A drive plate 46, which is bolted to a flange on the crankshaft 10, establishes a driving connection between crankshaft 10 and the shell part 40. The periphery of the drive plate 46 is bolted to a boss 48 carried by the shell part 40.

The hub of shell part 36 is secured to a sleeve 50 which is journalled by bushing 52 on stationary stator sleeve shaft 54. This forms a part of the wall 16.

The impeller shell carries impeller blades which define radially outflow passages in a toroidal fluid-flow circuit. This includes also radially inflow passages defined by a bladed turbine 56. The turbine has an outer shroud 58 with a hub 60 forming an outer race for an overrunning coupling 62. The inner race 64 of the coupling 62 is splined at 66 to turbine shaft 68. The splined connection 66 is capable of accommodating a limited degree of rotary displacement of the inner race 64 with respect to the shaft 68.

Overrunning clutch elements in the form of sprags or rollers are situated between the races 60 and 64 to establish a one-way driving connection between the turbine and the shaft 68. The hub of the turbine includes also an elongated outer race 70 of a second overruning coupling 72. The inner race 74 for the coupling 72 is splined to the shaft 68. Multiple spring coils 76 are situated between the races 70 and 74. The inner periphery of the coils 76 normally is in engagement with the outer peripheral surface of the race 74. The left-hand coil is adapted to be engaged by an actuator ring 78 as the latter moves concentrically with respect to the axis of the shaft 68. Ring 78 includes a projection 80 on its outer surface which is adapted to engage an axially extending groove 82 formed in the inner periphery of the inner race 64.

Normally the race 64 is biased to one of its extreme positions relative to the shaft 68. This is done by a preloaded coil spring 84. One end 86 of the coil spring 84 is received within a slot 88 formed in the end of the shaft 68. The other end 90 of the coil spring 84 is received within a slot 92 formed in the race 64. A plunger 94 situated slidably within a radial opening formed in the shaft 68 is engaged, as seen in FIGURE 1, by the end of a rocker shaft 96 located within a central opening 98 formed in the shaft 68. Shaft 96 is pivoted at its rounded center 100 within the opening 98.

The other end of the lever 96 is adapted to be engaged by a plunger 102 slidably situated within the right-hand end of the shaft 68. This plunger 102 is adapted to be moved radially inwardly by a cam plate 104 as it strikes the radially inward cam surface 106 on the cam plate 104. This plate is situated slidably within a radial opening formed between the wall 16 and the plate 20.

A spring detent element 108 engages the right-hand end of the lever 96. It is coned, as indicated, so that the lever 96 normally is biased to the position shown in FIGURE 1. The resistance of the detent spring shown at 110 must be overcome so that the shaft 96 can be pivoted about its center 100.

The torque converter 32 includes a bladed stator 112 situated between the flow exit section of the turbine and the flow entrance section of the impeller. Stator 112 includes a hub 114 which is journalled on stator sleeve shaft 54. It is anchored against rotation in one direction by an overrunning brake 116. Freewheeling motion in the direction of rotation of the impeller is permitted, however, during coupling operation of the converter.

The right-hand coil of the spring coils 76 is anchored against the inner race 74. When the left-hand coil is moved radially outwardly by the concentric ring 78, rotation of the turbine in the direction of rotation of the shaft 68 can be accomplished when the shaft 68 is acting as a driving member during coasting operation. The friction force between the left-hand coil and the element 76 triggers a self-energizing action of the spring so that the outside periphery of the spring will seize against the inner periphery of the race 70 thus locking the shaft 68 to the turbine.

The right-hand end of the shaft 68 is connected directly to power input gear 118 for the gear system shown in FIGURE 1. This gear engages a cluster gear element 120 carried by countershaft 122. A second cluster gear element 124 slidably splined to the shaft 122 engages drivably power output gear 126. Synchronizer clutch teeth 128 are carried by the gear 118.

A synchronizer clutch sleeve 132 is mounted slidably on synchronizer hub 134 which in turn is splined to the power output shaft 28. Shaft 28 is journalled by bearing 136 within the end of the shaft 68. It is journalled also, as indicated earlier, by the bearing 30 in the end wall 26.

When synchronizer clutch sleeve 132 is shifted in a left-hand direction, internal teeth 138 engage clutch teeth 130 thereby establishing a direct driving connection between the shaft 68 and the shaft 28. Gear 126 is disconnected from the shaft 28 at this time. When the sleeve 132 is shifted in a right-hand direction, its connection with the gear 118 is interrupted and a driving connection is established between the gear 126 and the shaft 28. This completes a low speed ratio torque delivery path.

The usual synchronizer blocker rings are provided in the assembly, which is shown in part at 132.

The synchronizer sleeve of assembly 132 is provided with external teeth 140 for establishing a reverse torque delivery path. These engage a reverse drive pinion, not shown, when it is shifted to the neutral position intermediate the teeth 130 and 128. The reverse drive pinion in turn engages the gear element 124 during reverse drive. The cam plate 104 is engaged by the shift rail 142 slidably situated within an opening 144 in the wall 26 and in an opening 146 in the plate 20.

The countershaft 122 is journalled by bearing 148 in a bearing opening formed in plate 20. It is journalled at the other end by a bearing 150 located in a bearing opening in the wall 26. The outboard end of the countershaft 122 is connected to a brake plate 152 which is adapted to be engaged by a brake piston 154. A cylinder 156 formed in end plate 158 receives the piston 154. Plate 158 is secured by bolts 160 to the housing 22. When fluid pressure is admitted to the cylinder 156, piston 154 brakes the brake disc 152 against the friction surface 162 formed on the right-hand side of plate 164. This plate in turn is secured to the wall 26 by the bolts 160.

The shift rail 142 carries a shifter fork 166 which engages in turn an annular groove formed in the sleeve 132. By shifting the rail 142 axially, the sleeve 132 can be engaged and disengaged with respect to the teeth 130 and 128.

When the rail 142 is in the direct drive position shown, cam plate 104 engages recess 168 formed in the rail 142. When the rail 142 is shifted to the low speed ratio position, however, cam plate 104 engages recess 170. When the rail 142 is in a neutral position, cam plate 104 is moved radially inwardly by the shift rail. At this time the plunger 102 strikes the cam surface 106 as the shaft 68 rotates. This causes the plunger 102 to move radially inwardly, thereby moving the lever 96 in a counterclockwise direction as viewed in FIGURE 1. This will allow the concentric ring 78 to move away from the left-hand coil of the spring coil element 76. This then will cause the coil element 76 to become disengaged from the inner peripheral surface of the race 70 thereby disengaging the turbine from the shaft 68. At that time the torque delivery path is interrupted, and ratio-shifting by sleeve 132 can be accomplished under zero torque conditions. The only forces that are present during the shift interval, therefore, are the inertia forces due to the rotation of the shaft 68. The inertia of the turbine is not present since the turbine, in effect, is disconnected from the shaft 68 by the overrunning coupling 62 when the synchronizer mechanism is shifted from one ratio to the other while the vehicle is in motion.

If the vehicle is shifted from a neutral position to either one or the other of the forward drive positions when the vehicle is stationary, a residual torque is applied to the shaft 68 through the turbine due to the fact that the turbine is idling as the engine idles. The effect of the residual turbine torque can be overcome by applying the brake shown in part at 152. The operator may do this by applying a brake pedal, which will introduce operating fluid to the cylinder 156. This will brake the countershaft 122 and the synchronizer sleeve then can be shifted under zero torque conditions.

If we assume that the operator shifts only from the neutral position to the low speed ratio position as he conditions the vehicle for acceleration from a standing start, the gear 124 can be caused to be displaced slightly with respect to the shaft 122. If the internal teeth of the sleeve 132 are misaligned with respect to the teeth 128, the splined connection between the gear element 124 and the shaft 122 can accommodate relative angular displacement. The gear element 124 can be biased normally to one of its extreme positions relative to the shaft 122 by a pretensioned spring 172. For a further description of other features of this gear system, reference may be made to copending application of Thomas R. Stockton, Serial No. 700,589 filed January 25, 1968.

When the vehicle operator initiates a shift, the first increment of movement of the shift rail 142 will force the cam plate 104 radially inwardly. This relaxes the last coil of the coil spring element 76. As explained previously, this disengages the turbine so that ratio changes can be accomplished by the synchronizer clutch and the gearing without difficulty. Upon completion of the shift, the cam plate 104 again will allow the plunger 102 to move radially outwardly. But this cannot occur because the ring 78 acts as an inihibitor.

Figure 4:
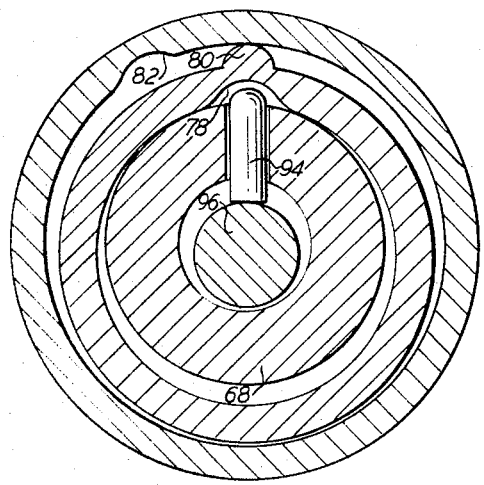
FIGURE 4 is a view corresponding to FIGURE 3, but it shows the elements of the clutch structure in different relative positions.

The race 64 is loosely splined to the shaft 68 so that a predetermined annular displacement is allowed between the splined parts. The spring 84 normally tends to urge the race 64 to one of its limiting positions. During the shift interval the spring moves the race 64 against a stop. At this time the groove 82 is out of registry with the propection 80 on the concentric ring 78. This condition is illustrated in FIGURE 4. It is impossible, therefore, to energize the spring 76 since the ring 78 is held in the position shown in FIGURE 4 out of contact with the left-hand coil of the spring 76. It is only when the engine throttle is open and the turbine speed rises to meet the shaft speed that the race 64 is shifted and the ring 78 is allowed to move to the clutch energizing position. The plunger 94, in addition to moving the ring 78 radially, is adapted to drive the ring in unison with the shaft 68.

As the vehicle is decelerated during coasting, and with the engine idling, the turbine is decelerated because of the energized clutch shown in part at 76. When the engine idling speed is reached, the functions of the clutches are interchanged. The clutch 62 at that time becomes engaged and the coast clutch 76 becomes disengaged.

During a shift with the engine throttle relaxed, the engine speed drops immediately, but the turbine speed is prevented from being reduced by the coast clutch. The operator then initiates movement of the shift rail which disengages the coast clutch 76 and latches the coast clutch in a de-energized position. When the vehicle operator reopens the engine throttle following a shift, the latch is removed and the coast clutch is re-energized. The latch is not released until the engine torque is sufficient to cause the turbine to speed up. Thus, the coast clutch is protected against relatively large speed differences following a transmission ratio shift.

If the shift occurs from a neutral condition while the vehicle is standing, the foot pedal operated brake 152 is energized.

What I claim and desire to secure by U.S. Letters Patent is:

1. A transmission mechanism comprising a hydrokinetic torque converter, a multiple ratio gear unit, said torque converter including an impeller adapted to be connected to an engine, a turbine situated in toroidal fluid flow relationship with respect to the impeller, a driven shaft, a turbine shaft, multiple ratio gearing including gear elements establishing plural torque delivery paths between the driven shaft and the turbine shaft, an overrunning coupling connection between the turbine and the turbine shaft for delivery torque from the turbine to the turbine shaft and permitting freewheeling motion of the turbine shaft with respect to the turbine in the direction of rotation of the turbine, a releasable spring clutch connection between the turbine and the turbine shaft comprising an outer race connected to the turbine, an inner race connected to the turbine shaft and a multiple coil spring element situated between the races, said turbine shaft being formed with a central opening, a control rod in said opening, a control ring surrounding said turbine shaft adjacent one end of said coil spring, a trigger element between one end of said control rod and said control ring whereby said control ring is moved radially upon movement of said control rod in one direction, said overrunning coupling connection between said turbine and said turbine shaft including an inner clutch race, and a rotary lost motion connection between said inner clutch race and said turbine shaft.

2. A transmission mechanism comprising a hydrokinetic torque converter, a multiple ratio gear unit, said torque converter including an impeller adapted to be connected to an engine, a turbine situated in toroidal fluid flow relationship with respect to the impeller, a driven shaft, a turbine shaft, multiple ratio gearing including gear elements establishing plural torque delivery paths between the driven shaft and the turbine shaft, an overrunning coupling connection between the turbine and the turbine shaft for delivering torque from the turbine to the turbine shaft and permitting freewheeling motion of the turbine shaft with respect to the turbine in the direction of rotation of the turbine, a releasable spring clutch connection between the turbine and the turbine shaft comprising an outer race connected to the turbine, an inner race connected to the turbine shaft and a multiple coil spring element situated between the races, said turbine shaft being formed with a central opening, a control rod in said opening, a control ring surrounding said turbine shaft adjacent one end of said coil spring, a trigger element between one end of said control rod and said control ring whereby said control ring is moved radially upon movement of said control rod in one direction, said overrunning coupling connection between said turbine and said turbine shaft including an inner clutch race, a rotary lost motion connection between said inner clutch race and said turbine shaft, and a torque responsive inhibitor means for preventing radial displacement of said control ring when torque is applied to said inner race by said turbine thereby preventing shifting movement of said control ring to a spring clutch energizing position.

3. A transmission mechanism comprising a hydrokinetic torque converter, a multiple ratio gear unit, said torque converter including an impeller adapted to be connected to an engine, a turbine situated in toroidal fluid flow relationship with respect to the impeller, a driven shaft, a turbine shaft, multiple ratio gearing including gear elements establishing plural torque delivery paths between the driven shaft and the turbine shaft, an overrunning coupling connection between the turbine and the turbine shaft for delivering torque from the turbine to the turbine shaft and permitting freewheeling motion of the turbine shaft with respect to the turbine in the direction of rotation of the turbine, a releasable spring clutch connection between the turbine and the turbine shaft comprising an outer race connected to the turbine, an inner race connected to the turbine shaft and a multiple coil spring element situated between the races, said turbine shaft being formed with a central opening, a control rod in said opening, a control ring surrounding said turbine shaft adjacent one end of said coil spring, a trigger element between one end of said control rod and said control ring whereby said control ring is moved radially upon movement of said control rod in one direction, said overrunning coupling connection between said turbine and said turbine shaft including an inner clutch race, a rotary lost motion connection between said inner clutch race and said turbine shaft, a torque responsive inhibitor means for preventing radial displacement of said control ring when torque is applied to said inner race by said turbine thereby preventing shifting movement of said control ring to a spring clutch energizing position, manually operable control means for changing ratio in said gear unit including a personally operable shift rail, and a cam connection between said shift rail and the other end of said control rod whereby the latter is shifted to a spring clutch engaging position following completion of a ratio change and is shifted to a spring clutch disengaging position when said shift rail initiates a ratio change.

4. The combination as set forth in claim 2 wherein said inhibitor means comprising interlocking inhibitor elements carried by said inner clutch race and by said control ring, said interlocking elements being moved out of registry when turbine torque applied to said inner race moves said inner race relative to said turbine shaft to one limiting position permitted by said lost motion connection.

5. The combination as set forth in claim 4 including spring means for normally urging said inner race to another limiting position.

References Cited

UNITED STATES PATENTS

| | | | |
|---|---|---|---|
| 1,576,996 | 3/1926 | Radcliffe | 192—3.21 |
| 2,726,513 | 12/1955 | McWethy et al. | 192—3.21 X |
| 2,789,448 | 4/1957 | Hapsley | 74—732 |
| 3,367,461 | 2/1968 | Nagel | 192—35 |

ARTHUR T. McKEON, *Primary Examiner.*

U.S. Cl. X.R.

192—3.21